United States Patent [19]

Eckman

[11] Patent Number: 4,961,521
[45] Date of Patent: Oct. 9, 1990

[54] ADJUSTABLE METERED DISPENSER

[76] Inventor: Ronald E. Eckman, 1797 Bolling Ave., Louisville, Ky. 40210

[21] Appl. No.: 439,623

[22] Filed: Nov. 21, 1989

[51] Int. Cl.$^5$ ............................................. A47G 19/12
[52] U.S. Cl. ................................ 222/142.5; 222/158; 222/162; 222/439; 222/456; 222/545; 222/556; 222/565
[58] Field of Search ............... 222/158, 144, 162, 434, 222/438, 439, 450, 454, 456, 543, 545, 556, 565, 142.5

[56] References Cited

U.S. PATENT DOCUMENTS

| 937,723 | 10/1909 | Seiffert | 222/439 X |
|---|---|---|---|
| 2,579,388 | 12/1951 | Lowry . | |
| 3,006,506 | 10/1961 | Germano | 222/439 X |
| 3,055,560 | 9/1962 | Meshberg . | |
| 3,179,303 | 4/1965 | Dankoff et al. | 222/438 X |
| 3,409,188 | 11/1968 | Wright | 222/565 X |
| 3,446,403 | 5/1969 | Serio | 222/158 |
| 3,512,681 | 5/1970 | Frankel | 222/158 |
| 3,873,001 | 3/1975 | Shulman . | |
| 4,474,312 | 10/1984 | Donoghue . | |
| 4,545,508 | 10/1985 | Cribb, Jr. et al. | 222/545 X |
| 4,717,050 | 1/1988 | Wright | 222/545 X |

Primary Examiner—Andres Kashnikow
Assistant Examiner—Gregory L. Huson
Attorney, Agent, or Firm—Henderson & Sturm

[57] ABSTRACT

An adjustable metering dispenser apparatus having a container for holding free-flowing materials. The top of the container has at least one opening therein and a cap is provided for opening or closing the top. The cap is rotatable for allowing it to be moved between the open and closed position. A metering chamber is slidably disposed on the exterior of the container and is adjustable by telescoping it with respect to the container for adjusting the size of a chamber therein by such sliding motion. A closure is provided on one end of the metering chamber for selectively opening or closing it so that once the material has been measured in the metering chamber, it can be freely dispensed in a normal way.

1 Claim, 2 Drawing Sheets

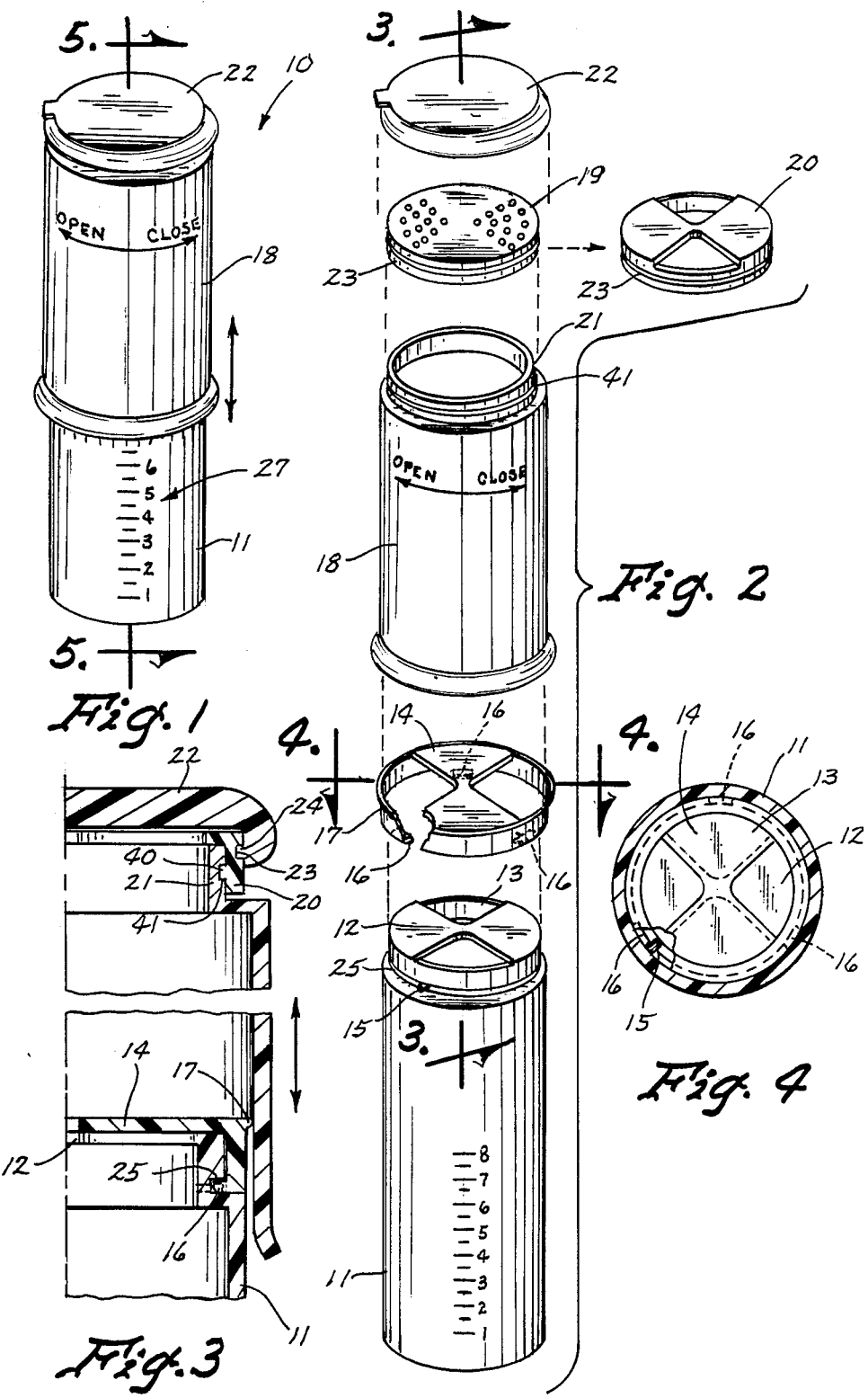

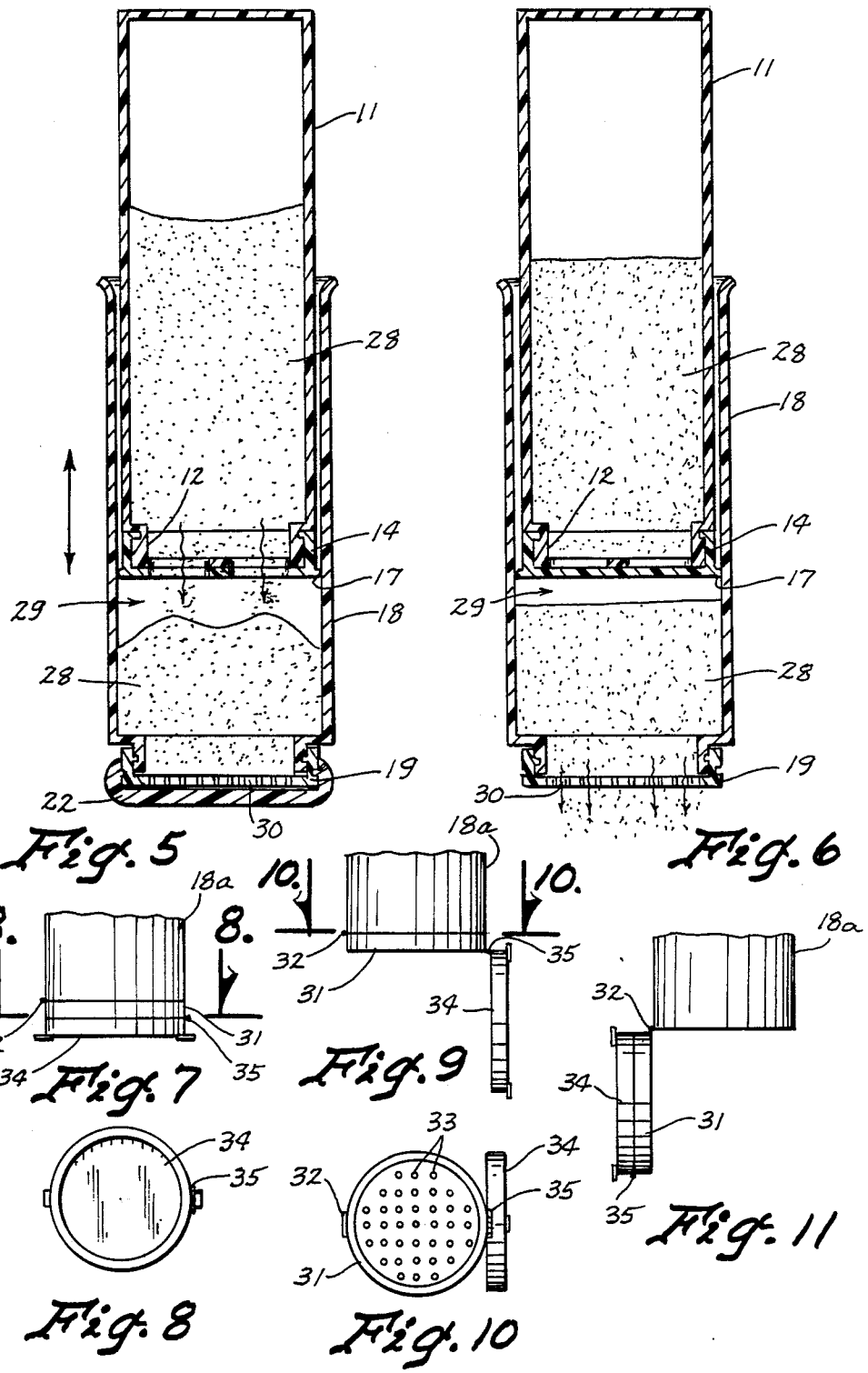

ADJUSTABLE METERED DISPENSER

TECHNICAL FIELD

The present invention relates generally to dispensers and more particularly to a dispenser for free-flowing materials such as granular, powdered or liquid materials.

BACKGROUND ART

To use most free-flowing materials, they must normally be stored in a suitable container and then when they are ready for use they are measured by separate measuring devices and then transferred to a place of use or dispensed in some other way. Materials of this nature would include things such as spices and condiments which are typically measured in teaspoons or fractions thereof. Coffee is typically measured in scoops and sugar, flour or laundry detergent is typically measured in cups or fractions of a cup. Other materials which need to be stored, measured and dispensed include products such as sugar, flour, laundry products, foodstuffs such as powdered milk, cornmeal, instant potatoes, grits, gelatin desserts, gravy mixes, and powdered pudding products, and beauty aids such as granular bubble bath products. Patented medicine such as Epsom Salts and products to promote bulk in the digestive tract also need to be stored, measured and dispensed. All of the aforementioned products are typically used by storing them in one container and measuring them in another. There is consequently a need for a device which will store, measure and dispense a free-flowing material in a simple and convenient way.

DISCLOSURE OF THE INVENTION

The present invention relates to an adjustable metering dispenser apparatus having a container for holding free-flowing materials. The top of the container has at least one opening therein and a cap is provided for opening or closing the top. The cap is rotatable for allowing it to be moved between the open and closed position. A metering chamber is slidably disposed on the exterior of the container and is adjustable by telescoping it with respect to the container for adjusting the size of a chamber therein by such sliding motion. A closure is provided on one end of the metering chamber for selectively opening or closing it so that once the material has been measured in the metering chamber, it can be freely dispensed in a normal way.

An object of the present invention is to provide an adjustable metering dispenser for free-flowing materials.

Another object of the present invention is to provide an adjustable metering dispenser which stores, measures and dispenses free-flowing material.

A further object of the present invention is to provide an adjustable metering dispenser which is versatile enough to accommodate a large number of diverse types of products such as those listed in the background of the invention above.

A still further object of the present invention is to provide an adjustable metering dispenser which is economical to produce and is easy to use.

A still further object of the present invention is to provide an adjustable metering dispenser that can be adapted to various sizes of measure to accommodate a usual amount for different products such as fractions or multiples of teaspoons for spices, scoops for coffee, and cups for cooking products such as sugar, flour, dried beans, macaroni or other products such as laundry detergent.

Other objects, advantages, and novel features of the present invention will become apparent from the following detailed description of the invention when considered in conjunction with the accompanying drawings.

BRIEF DESCRIPTION OF THE DRAWINGS

FIG. 1 is a perspective view of a preferred embodiment of the present invention;

FIG. 2 is an exploded view of the preferred embodiment shown in FIG. 1 and having shown an optional dispensing cap on the metering chamber;

FIG. 3 is an enlarged partial cross sectional view taken along line 3—3 of FIG. 2;

FIG. 4 is an enlarged cross sectional view taken along line 4—4 of FIG. 2;

FIG. 5 is a cross sectional view taken along line 5—5 of FIG. 1 and showing material being transferred from the storage chamber to the measuring chamber thereof;

FIG. 6 is a cross sectional view like FIG. 5 but showing the material in the storage chamber being closed off and the material in the metering chamber being dispensed through holes in the cap thereof;

FIG. 7 is a side elevational view of an optional cap for the dispensing chamber;

FIG. 8 is a cross sectional view taken along line 8—8 of FIG. 7 and showing a solid cap hingedly connected thereto;

FIG. 9 is a side elevational view of the apparatus of FIG. 7 but showing the cap being hinged open to allow material to flow through holes in the dispensing cap;

FIG. 10 is a cross sectional view taken along line 10—10 of FIG. 9 which shows the holes through which the material can flow in the FIG. 7 through 11 embodiment; and FIG. 11 is a side elevational view similar to FIGS. 7 and 9 except that both the perforated lid and the solid lid are pivoted open together so that material can be merely dumped freely out of the metering chamber.

BEST MODES FOR CARRYING OUT THE INVENTION

Referring now to the drawings wherein like reference numerals designate identical or corresponding parts throughout the several views, FIG. 1 shows an adjustable metering dispenser apparatus (10) constructed in accordance with the present invention.

Referring to FIG. 2, it is noted that the adjustable metering dispenser apparatus (10) has a container (11) with a top (12) having a pair of openings (13) disposed therein. Material can be fed in through the openings (13), or alternatively, the container (11) could have a cap on the bottom thereof (not shown) for inserting free-flowing materials therein.

A cap (14) slides over the top of the cap (12) and will freely rotate about the cap (12) except for the presence of a stop peg (15) which stops projections (16) in the cap (14) at the open and closed positions thereof. The top of the cap (14) has a sealing lip (17) therein for sealing between such lip (17) and the interior of the metering chamber cylinder (18) which slides thereover.

The metering chamber cylinder (18) has optional caps (19) and (20), and of course caps having other shaped openings could be substituted as well. The cap

(19) snaps onto the lip (21) on the metering chamber cylinder (18) and, as mentioned, is interchangeable with the cap (20). Annular ring (40) extends into groove (41) in lip (21). A closure cap (22) can be snapped over either of the caps (19) or (20) and an annular rib (24) on the inside and underside of cap (22) snaps into a groove (23) in caps (19) and (20).

Referring to FIG. 3, it is noted that the projections (16) fit into the groove (25) in the top portion of the container (11) and that they abut the stop (15) in one direction to stop the cap (14) at the closed position thereof. The stop (15) will be struck by another of the projections (16) when the cap (14) is moved to rotate it to the open position thereof. FIG. 3 also shows how the closure (22) has an annular projection (24) which snaps into groove (23) in the dispensing cap (20) or (19).

In operation of the adjustable metering dispenser (10) shown in FIGS. 1-6, it will be noted that indicia (27) on the container (11) is provided to show how many units are contained in the measure chamber (29) for each level. These units can be different for each particular dispensing unit (10). As noted above, these indicia can be in teaspoons for products that are typically measured in teaspoons such as for spices or condiments. These indicia (27) can be in scoops for coffee or in cups for products like sugar, flour or laundry detergent. Obviously, other units can be selected which are appropriate for other free-flowing materials.

Once the container (11) is filled with free-flowing material, the metering chamber cylinder (18) can be moved up or down as shown in FIG. 1 so that the bottom edge thereof is lined up with the amount of the product that is desired to be measured and dispensed. For example, in FIG. 1, the bottom of the cylinder (18) is lined up with seven units, but it is to be understood that it could be lined up with more or less units if desired.

FIG. 4 shows the cap (14) turned to the closed position with one of the tabs (16) in abutment with the stop (15). Turning the cap (14) in the clockwise position from that shown in FIG. 4 until the stop (16) on the lower right is in abutment with the stop (15) will put the cap (14) in the open position thereof so the openings (13) in the top (12) will align with the openings in the cap (14).

If the seal (17) is tight enough against the inside of the cylinder (18) as is preferred, rotation of the cylinder (18) will also cause rotation of the cap (14). Once the desired amount of product is selected by sliding the cylinder (18) to the desired indicia number (27), the cylinder (18) can be rotated to the open position to open the cap (14) from the position shown in FIG. 4 to the position shown in FIG. 5. Then the adjustable metering dispenser (10) can be turned over to the position shown in FIG. 5 and the free-flowing material (28) will pour through the openings in cap (12) and cap (14) and into the measuring chamber (29) inside the metering chamber cylinder (18). Once the metering chamber (29) is full, the cylinder (18) is rotated to the closed position as indicated by the arrows in FIGS. 1 and 2, which will close off the openings between the container (11) and the metering chamber cylinder (18), for example, to the position shown in FIGS. 4 and 6.

With the metered amount of material then in the metering chamber (29), the cap (22) can be removed and the material (28) within the metering chamber (29) can pass through the openings (30) in cap (19) as shown in FIG. 6. For example, if the material (28) was a spice and four tablespoons of such spice were desired, then the indicia (27) No. 4 would be lined up with the bottom of the cylinder (18) at the beginning of the process so that four tablespoons would be transferred into the metering chamber (29). Consequently, that four tablespoons would be available to pass through the openings (30) in the cap (19).

Referring now to FIGS. 7-11, an alternate type of cap can be utilized as a substitute for the caps (19), (20) and (22). The tube (18) would be slightly modified as shown by cylinder (18a) as indicated in FIGS. 7-11. A first cap (31) would be hingedly connected to the cylinder (18a) by a hinge (32). This cap (31) has a plurality of openings (33) disposed therethrough. Another cap (34) is connected by a hinge (35) to the cap (31) and the cap (34) is solid to prevent material from passing therethrough. These caps can snap together, if desired, to hold them in place.

To utilize the embodiment shown in FIGS. 7-11, it is noted that when the caps (31) and (34) are pivoted to the closed position shown in FIG. 7 nothing will pass out of the metering chamber cylinder (18a). When it is desired to dispense material out of the metering chamber cylinder (18a) slowly, such as for pepper or other spices, the lid (14) is pivoted open to the position shown in FIG. 9 and in that position the material can freely flow therethrough in a similar fashion to that shown in FIG. 6.

If it is desired to merely dump the material from the metering chamber cylinder (18a), both of the lids (34) and (35) are tipped to the position shown in FIG. 11 and the material therein will freely flow out of the cylinder (18a). To close the lids (31) and (34), they are merely pivoted together back to the position shown in FIG. 7. Similarly, if it desired to close the lid (34) after it is in the position of FIG. 9, it would merely be pivoted back to the position shown in FIG. 7.

Accordingly, it will be appreciated that the preferred embodiments shown herein do indeed accomplish the aforementioned objects. It is apparent, for example, that shapes other than cylindrical could be used for the container (11) and metering cylinder (18) if the valving of the lid (14) is modified slightly. Similarly, it will be appreciated that the uses of the device shown in the drawings is limited only by the imagination of the user since many kinds of free-flowing materials, whether powdery, granular or liquid are used. The dispenser (10) can be manufactured in conjunction with the construction of larger storage units, allowing materials to be metered from the containers through this dispenser unit. For example, ground coffee is purchased in 13 oz. to 3 lb. containers. A dispenser that would measure up to 3 "coffee scoops" would be 1" diameter by 2.63" long. In this situation it can be seen that the dispenser would be constructed into the lid of the coffee container and would not actually be the storage unit for the coffee but would constitute a way to accurately dispense the coffee from the storage container. Obviously many modifications and variations of the present invention are possible in light of the above teachings. It is therefore to be understood that, within the scope of the appended claims, the invention may be practiced otherwise than as specifically described.

I claim:

1. An adjustable metering dispenser apparatus consisting of:

cylindrical container means for holding free flowing materials, said cylindrical container means having an open end, a bottom and continuous sidewalls sealingly connected to said bottom;

a top operatively connected to said sidewalls and overlying said open end;

at least one opening disposed in said top;

cylindrical cap means for selectively opening or closing said opening in said top;

means for rotatably attaching said cap means to said container means;

a cylindrical metering chamber means slidable disposed on the exterior of said sidewalls for adjusting the size of the chamber therein by sliding said metering chamber means with respect to said container means;

closure means on one end of said metering chamber means for selectively opening or closing said metering chamber means;

metering cap means attached to said one end of said metering chamber means and disposed between said one end and said closure means for closing a portion of said one end of said metering chamber and permitting flow through another portion thereof; said metering cap means having a first enlarged cylindrical cap having a plurality of holes therethrough pivotally attached to said one end of said metering chamber means, wherein the diameter of the said first enlarged cap is equal to the diameter of the said metering chamber for movement between a first position covering said one end and a second position opening said one end; and said closure means having a second enlarged cylindrical cap pivotally attached to and having same diameter as said first cap, said second cap having a first position in juxtaposition to said first and a second position at least 90 degrees from said first position thereof, said second cap having a continuous position thereof for closing off said holes when said second cap is in the first position thereof.

* * * * *